June 9, 1936.   W. J. KIRKPATRICK ET AL   2,043,380

TIRE VALVE

Original Filed April 7, 1932

Inventors
*William J. Kirkpatrick
and Frederik G. Whittington*
By their Attorneys
*Fraser, Myers & Manley.*

Patented June 9, 1936

2,043,380

UNITED STATES PATENT OFFICE 2,043,380

TIRE VALVE

William J. Kirkpatrick and Frederik G. Whittington, Garden City, N. Y., assignors, by mesne assignments, to Scovill Manufacturing Company, Waterbury, Conn., a corporation of Connecticut Application April 7, 1932, Serial No. 603,724
Renewed December 23, 1933

6 Claims. (Cl. 152—12)

The present invention relates to tire valves and aims to provide certain improvements therein. More particularly it relates to tire valve means for facilitating the application of inner tubes equipped with rubber valve stems to wheel rims, especially to so-called drop-center rims.

For use with drop center rims many inner tubes are now equipped with rubber valve stems most of which are of relatively short length, which, upon deflation of the tube while upon a wheel in motion, will be withdrawn through the valve stem opening in the rim into the tire casing to protect the tube from damage. Because of the shortness of the valve stem, however, difficulty and annoyance are encountered in guiding and holding the valve stem in the valve stem opening while installing the tire upon such rim.

According to our present invention we obviate this difficulty and annoyance by the provision of tire valve means which may be directly associated with the valve stem. These means may be in the form of an extension member which not only assists in guiding the valve stem through the opening in the rim, but also insures said stem, once it is through the rim, against being accidentally withdrawn into the casing prior to inflation of the tube. As herein shown, we accomplish this by providing a rigid extension member adapted to be detachably secured to the coupling end of the rubber valve stem, the extension member being provided with means, which, when the valve stem is pulled through the opening in the rim, will engage the latter to hold the stem against accidental withdrawal while the extension member is attached thereto. Upon inflation of the tube, the pressure therein will hold the valve stem in position and the extension member can then be disconnected therefrom. The invention also embodies other features of novelty which will be appreciated from the detailed description which follows, when considered in conjunction with the accompanying drawing, wherein—

Figure 1:
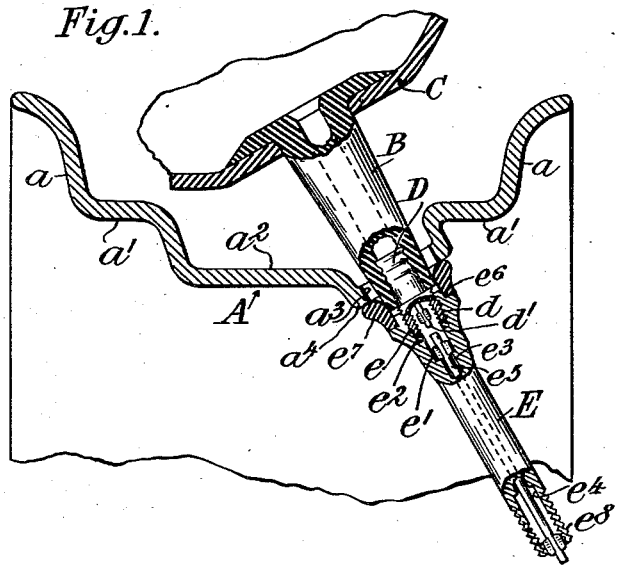
Figure 1 is a radial section of a drop center rim showing our invention applied to a valve stem which is inserted through the valve stem opening in said rim, the valve stem and extension member being shown partly in section and partly in elevation.

Referring to the drawing, let A indicate a drop center rim having side flanges $a$, tire bead supporting portions $a'$ and a central channel portion $a^2$ having a valve stem opening $a^3$ therein and extending through one of the channel angles and providing an inturned annular lip $a^4$ at said opening. B indicates a conventional form of rubber valve casing having a tapered outer wall, the inner end of which is attached to an inner tube C in any preferred manner, and in the outer end of which is secured, preferably by being cured therein, a tubular valve casing D, the outer end $d$ of which extends beyond the outer end of the valve stem B, said casing D being fitted with a valve insides (not shown) of any preferred form having a valve deflating pin $d'$ extending to the outer end of said casing. As is conventional, both the exterior and interior of the outer end $d$ of the casing are screw-threaded.

Adapted for detachable connection with the valve stem B through the medium of the external screw-threads on the casing D is a tubular extension member E provided at its valve attaching end with an enlarged, internally screw-threaded chamber $e$ which is reduced inwardly thereof, as indicated at $e'$, to provide inwardly of the chamber $e$ a shoulder upon which is fitted a packing $e^2$ adapted to make leak-tight contact with the end of the casing D when said extension member is threaded thereon. Inwardly of the chamber $e'$ the bore of the extension member is again reduced, as indicated at $e^3$, and again enlarged near the outer end of the extension, as indicated at $e^4$. Within said bore is a deflating pin $e^5$ which is held against removal therefrom by having its end portions enlarged beyond the diameter of the bore $e^3$. At the valve attaching end, the extension member is somewhat enlarged exteriorly, but not beyond the diameter of the opening $a^3$ in the rim, and is provided with an annular groove or rabbet $e^6$, within which is disposed so as to lie substantially flush with the enlarged diameter of the extension, an outwardly-flared, tubular elastic portion or skirt $e^7$ which is preferably formed of rubber and cured onto the extension member within said groove $e^6$. The skirt portion $e^7$ is adapted to encompass the outer end of the rubber valve stem B when the extension member is attached thereto and has a maximum diameter which is normally greater than that of the opening $a^3$ in the rim but adapted to be contracted into engagement with the outer wall of the stem B so as to pass through said opening when the member E is passed therethrough. At its outermost end the extension member E is externally screw-threaded, as indicated at $e^8$, for accommodating an inflating coupling or chuck.

Figure 2:
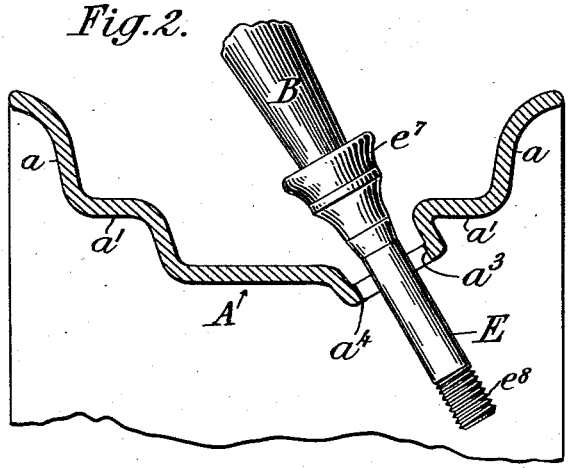
Fig. 2 is a view similar to Fig. 1 showing the relation of the valve stem, the extension member and the valve stem opening in the rim prior to the valve stem being drawn through said opening.

In use, the extension member E is threaded onto the outer end of the valve stem B and assumes therewith the relationship best shown in Fig. 2, whereby the effective length of the valve stem B is substantially increased. In installing a tire upon the rim the extension member E is inserted through the valve stem opening $a^3$ and the rubber skirt portion contracted as the stem B is drawn through said opening. Upon passing through the opening the skirt portion $e^7$, due to its inherent resiliency, will regain its normal form, which, at the flared end being of greater diameter than the opening in the rim, will prevent the extension member E from moving backwardly through the opening because of the engagement of said flared end of the skirt portion with the lip $a^4$. The valve stem B, therefore, will likewise be prevented from moving backwardly through the opening. The conventional coupling or hose chuck is then applied to the end $e^8$ of the extension member, whereupon the deflating pin $e^5$ will engage the valve pin $d'$ to unseat the valve check within the valve stem, and the inner tube C may thereupon be inflated. Naturally, inflation of the inner tube will force the walls thereof into engagement with the channel $a^2$ of the rim and thereby force the valve stem B completely through the opening in the rim and will hold the valve stem in such position as long as the tube remains inflated. The extension member E is thereupon disconnected from the valve stem so as to leave the tire with its valve stem protruding but a short distance through the rim. The extension member can be carried in a tool chest and used as needed, or may provide an accommodation tool at tire repair stations.

The valve stem extension member which we have provided is exceedingly simple in construction and efficient in use for the purpose for which it is intended, and while we have shown but a single embodiment of our invention it is to be understood that we do not wish to limit ourselves to the precise details of construction shown, since the same may be varied without departing from the spirit of the invention.

What we claim is:

1. A tire valve stem extension member comprising a tubular element having means for attachment to a valve stem, said extension member being adapted to pass through the opening in a wheel through which the tire valve stem is intended to pass, and having means thereon for engagement with the wheel in proximity to the valve stem opening therein for preventing the withdrawal of the valve stem through said opening while the extension member is on the valve stem.

2. A tire valve stem extension member comprising a tubular element having means for attachment to a valve stem, said extension member being of a diameter to pass through the valve stem opening in a wheel rim and having elastic means thereon for engagement with the inner side of the wheel rim in proximity to the valve stem opening therein after said extension member while attached to a valve stem, has been inserted through said opening.

3. A tire valve stem extension member comprising a tubular element having at one end thereof, means for attachment to a valve stem and contractile means having a normal diameter greater than the opening through which the valve stem is intended to extend.

4. A tire valve stem extension member comprising a tubular element having at one end thereof, means for attachment to a valve stem and outwardly flared contractile means having a normal diameter greater than the opening through which the valve stem is intended to extend.

5. A tire valve stem extension member comprising a tubular element having at one end thereof, means for attachment to a valve stem and a substantially frusto-conical elastic sleeve having a normal maximum diameter greater than the opening through which the valve stem is intended to extend.

6. A tire valve stem extension member comprising a tubular element having at one end thereof, means for attachment to a valve stem and a substantially frusto-conical elastic sleeve having a normal maximum diameter greater than the opening through which the valve stem is intended to extend, said sleeve extending beyond the valve stem engaging end of the tubular element.

WILLIAM J. KIRKPATRICK.
FREDERIK G. WHITTINGTON.